Oct. 26, 1954     G. W. BRUNTS ET AL     2,692,466
DISK TYPE LAWN MOWER

Filed Oct. 26, 1951                         2 Sheets-Sheet 1

INVENTORS
GEORGE W. BRUNTS
FRANK L. SHUTTERS

BY
McMorrow, Berman & Davidson
ATTORNEYS

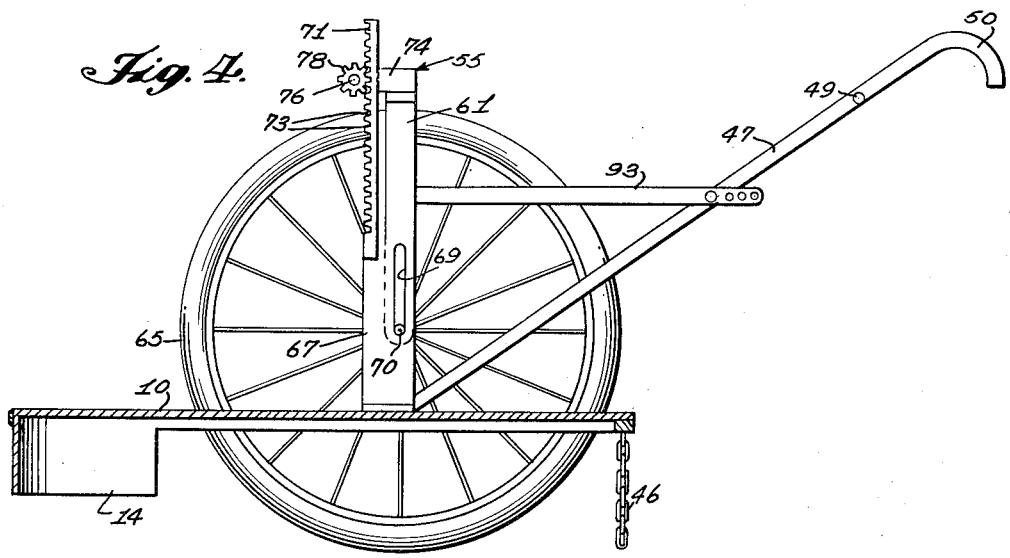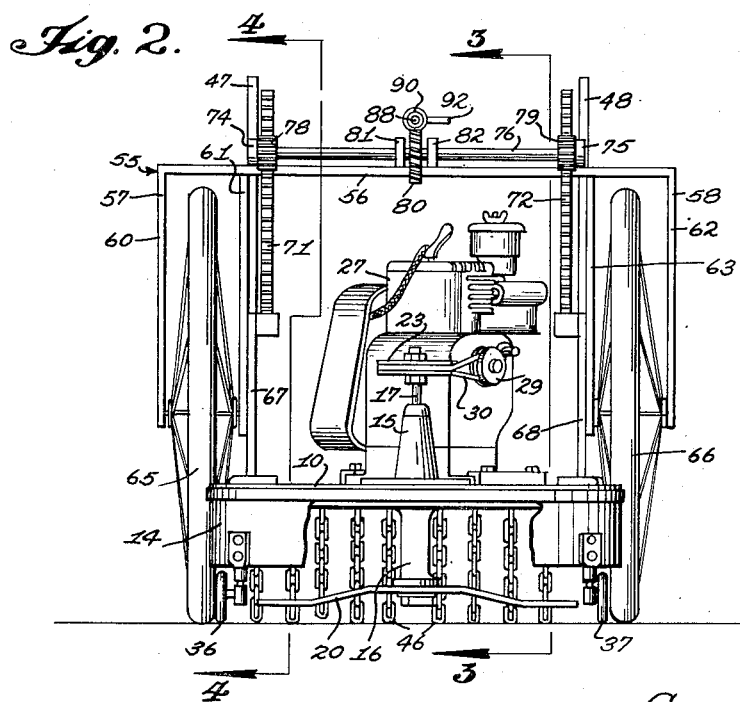

Patented Oct. 26, 1954

2,692,466

UNITED STATES PATENT OFFICE 2,692,466

DISK TYPE LAWN MOWER

George W. Brunts, Nevada, and Frank L. Shutters, Milo, Mo.; said Shutters assignor to said Brunts Application October 26, 1951, Serial No. 253,402

1 Claim. (Cl. 56—25.4)

This invention relates to an improved rotary disk mower.

It is among the objects of the invention to provide an improved rotary disk lawn mower having supporting wheels, manually operated means for raising and lowering the cutting blade while the mower is in operation; which has guards disposed in front of and to the rear of the cutting disk to protect the disk from being damaged by encountering solid obstacles and to protect the feet and legs of the operator against objects thrown rearwardly by the disk; which has rollers or wheels disposed both in front of and in rear of the cutting disk to prevent the disk from cutting into the ground at any time; and which is simple and durable in construction, economical to manufacture, and effective and efficient in operation.

Other objects and advantages will become apparent from a consideration of the following description and the appended claim in conjunction with the accompanying drawings, wherein:

Figure 2 is a front elevational view of the lawn mower illustrated in Figure 1, a portion being broken away to better illustrate the construction thereof;

Figure 4 is a cross-sectional view on the line 4—4 of Figure 2.

Figure 1:
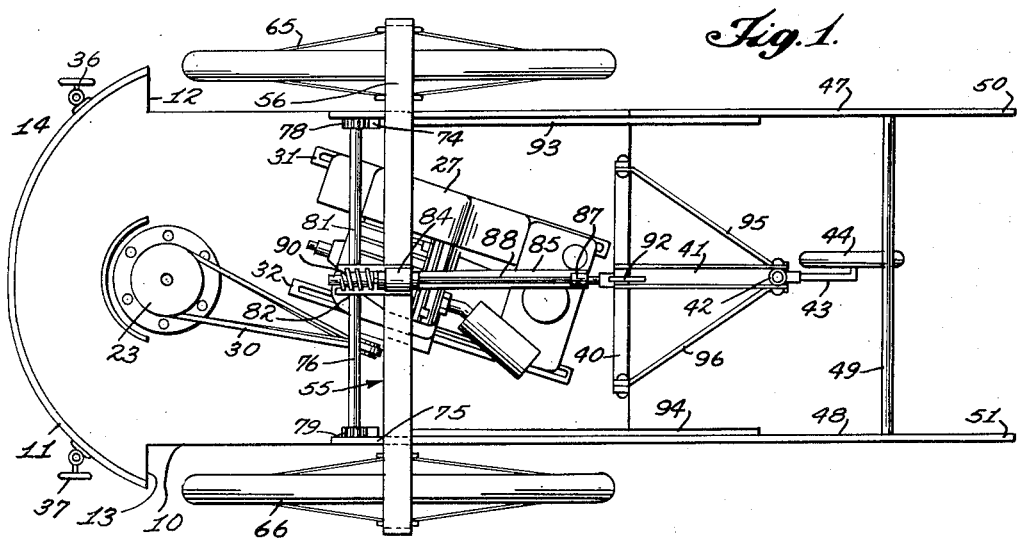
Figure 1 is a top plan view of a lawn mower illustrative of the invention.
Figure 3:
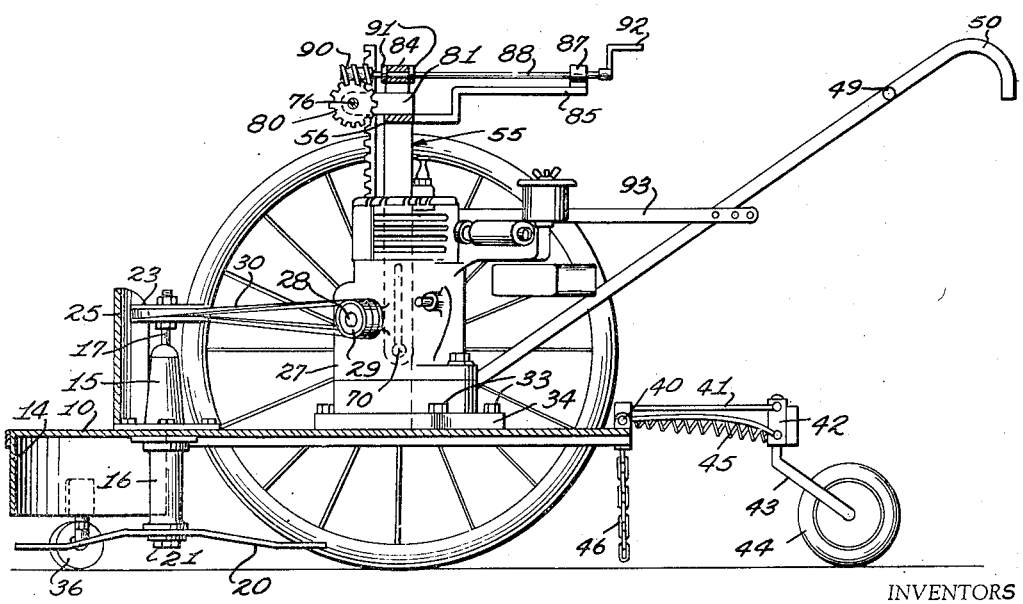
Figure 3 is a cross-sectional view on the line 3—3 of Figure 2.

With continued reference to the drawings, the lawn mower comprises a platform 10 in the form of a flat plate of longitudinally elongated, substantially rectangular shape, having an arcuately curved front end edge 11 which extends at its ends somewhat beyond the corresponding side edges of the remainder of the platform to provide transverse shoulders 12 and 13, one at each side of the platform at the ends of the curved front edge of the latter. A guard plate 14 of partly cylindrical shape is disposed coextensively with the curved front end edge 11 of the platform 10 and depends from the front end of the platform substantially perpendicular thereto.

The platform 10 is provided with an aperture substantially at the center of curvature of the arcuately curved front end edge 11 thereof and upper and lower vertical bearing bosses 15 and 16, respectively, are mounted on the platform with their bores in alignment with each other and in registry with the aperture in the platform. The boss 15 projects upwardly from the upper surface of the platform and the boss 16 depends from the lower surface of the platform, and a shaft 17 extends through the bosses 15 and 16 and platform 10 and has one end above and one end below the platform. A cutter disk 20 is centrally mounted on the shaft 17 at the lower end of the lower bearing boss 16 by suitable means including a nut 21 threaded onto the shaft 17 at the lower end of the latter. A belt pulley 23 is mounted on the shaft 17 near the upper end of the latter. A curved guard 25 is secured at its lower end to the platform and projects upwardly from the platform substantially perpendicular to the latter and in front of the bearing boss 15 and belt pulley 23.

A motor 27, such as a one-cylinder gasoline engine of a small horsepower type now readily available on the market, is mounted on the platform 10 rearwardly of the bearing boss 15 and extends upwardly from the platform. This motor has a drive shaft 28, the axis of which is disposed at an angle to the side edges of the platform, and a belt pulley 29 is mounted on one end of the shaft 28 and connected to the belt pulley 23 by a belt 30, the ends of which are disposed at substantially right angles to each other.

The engine 27 is mounted on the platform by means including guideways 31 and 32, so that the engine can be adjustably moved toward and away from the bearing boss 15 to adjust the tension of the belt 30, the engine being clamped in position longitudinally of the guideways by suitable means, such as the hold-down bolts 33 extending through apertures in the base flange 34 of the engine.

Small caster wheels or rollers 36 and 37 are mounted on the front guard 14 of the mower one at each end of the guard, and extend below the guard and below the cutting disk 20 to prevent the blade from digging into the ground at the front end of the mower.

A bracket 40 is mounted on the platform substantially at the mid-width location of the rear edge of the platform, and an arm 41 is pivotally connected at its front end to the bracket 40 and extends rearwardly from the platform for up-and-down movement of its distal end relative to the platform. A caster wheel sleeve 42 is mounted on the arm 41 at the rear, distal end of the arm, and a fork 43 is journaled at its upper end in the sleeve 42 and declines rearwardly relative to the axis of rotational movement between the fork and the sleeve. A wheel 44 is journaled on the fork 43 at the end of the fork remote from the sleeve 42, and a tension spring 45 is connected at one end of the sleeve 42 and at its other end to the bracket 40, and is disposed below the arm 41 to resiliently urge the distal end of the arm 41 downwardly and the rear end of the platform 10 upwardly. This rear caster wheel assembly effectively supports the rear end of the platform and prevents the cutter blade 20 from digging rearwardly into the ground.

Chains 46 depend from the rear edge of the platform at spaced apart locations along the rear edge and serve as a guard to prevent objects thrown rearwardly by the cutter disk 20 from injuring the feet or legs of a person operating the mower.

Handles 47 and 48 are attached at their front ends to the platform 10, one at each opposite side of the engine 27, and these handles are inclined upwardly and rearwardly relative to the platform with their center lines substantially in vertical planes parallel to the side edges of the platform. Near their upper ends the handles 47 and 48 are connected by a crossbar 49, and the handles are curved downwardly at their rear ends and provide hand grips 50 and 51.

A frame, generally indicated at 55, extends transversely of the platform intermediate the length of the latter and includes a top bar 56 extending across the platform above the engine 27, and wheel forks 57 and 58 depending from the top bar 56, one at each end of the latter. The wheel fork 57 comprises spaced apart and substantially parallel bars 60 and 61 with the bar 60 depending from the corresponding end of the top bar 56 and the bar 61 spaced inwardly of the top bar from the bar 60, and the wheel fork 58 comprises corresponding bars 62 and 63 with the bar 62 depending from the corresponding end of the top bar.

Wheels 65 and 66 are disposed in the wheel forks 57 and 58, respectively, and journaled in these forks by axles secured at their ends to the wheel fork bars at the lower ends of the latter and extending through these wheel hubs.

Fixed standards 67 and 68 project perpendicularly upwardly from the platform 10, one adjacent the inner side of the wheel fork bar 61 and the other adjacent the inner side of the wheel fork bar 63. These standards are vertically slotted, as indicated at 69 for the standard 67 in Figure 4, and bolts, as indicated at 70, carried by the fork bars 61 and 63, extend through the slots in the standards 67 and 68, respectively, to provide guide and motion limit stop means between the wheel forks and the standards.

A rack bar 71 is secured at its lower end to the upper end of the standard 67 and extends substantially vertically upward from the standard 67, while a similar rack bar 72 is secured at its lower end to the upper end of the standard 68 and extends substantially vertically upward from this standard, both of the rack bars having forwardly facing rack teeth 73.

Bearing brackets 74 and 75 are mounted on the top bar 56 of the frame, one near each of the wheel forks 57 and 58, and these brackets extend upwardly from the top bar 56. A shaft 76 is journaled at its ends in the brackets 74 and 75 and is disposed above and substantially parallel to the frame top bar 56.

Pinions 78 and 79 are mounted on the shaft 76 adjacent the bearing brackets 74 and 75, respectively, and mesh respectively with the rack bars 71 and 72. A worm wheel 80 is mounted on the shaft 76 substantially at the mid-length location of the shaft and between bearing brackets 81 and 82 which extend upwardly from the frame bar 56 and receive the shaft 76. A bearing block or bracket 84 extends upwardly from the shaft between the brackets 81 and 82 and has its bore disposed substantially at right angles to the shaft 76 and an arm 85 extends rearwardly from the bar 56 and carries at its rear end a bearing block or bracket 87, the bore of which is in alignment with the bore of the bearing block 84. A shaft 88 extends through and is journaled in the bearing blocks 84 and 87, and a worm 90 is secured on the front end of the shaft 88 and meshes with the worm wheel 80. Thrust collars 91 are mounted on the shaft 88, one at each side of the bearing block 84 to hold the shaft 88 against longitudinal movement, and a hand crank 92 is mounted on the rear end of this shaft.

Braces 93 and 94 are connected at their front ends to the inner bars 61 and 63 of the wheel forks and extend rearwardly therefrom. At their rear ends these braces are adjustably connected to the handles 47 and 48 intermediate the length of the handles, and diagonal braces 95 and 96 extend rearwardly from the ends of the elongated bracket 40 to the caster wheel sleeve 42 to reinforce the arm 41.

With this arrangement, the platform 10, together with the engine 27 and cutter blade 20, can be raised or lowered by rotating the hand crank 92 in the appropriate direction to raise and lower the platform relative to the wheel-supported frame 55, and this raising and lowering of the platform and cutter blade can be accomplished when the mower is in operation. Engagement of the bolts 70 with the lower ends of the slots in the standards 67 and 68 limits downward movement of the platform and cutter blade so that the cutter blade cannot be lowered into contact with the ground.

The invention may be embodied in other specific forms without departing from the spirit or essential characteristics thereof. The present embodiment is, therefore, to be considered in all respects as illustrative and not restrictive, the scope of the invention being indicated by the appended claim rather than by the foregoing description, and all changes which come within the meaning and range of equivalency of the claim are, therefore, intended to be embraced therein.

What is claimed is:

In a mower, a horizontal platform, spaced standards rising from opposite sides of the platform, wheel forks having inner and outer vertical members, wheels positioned between and journaled on the inner and outer vertical members of the forks, vertically elongated pin and slot means coacting between said inner fork members and serving to limit upward and downward movement of said forks relative to the platform, vertical racks fixed to said standards, a cross member extending between and fixed to upper parts of said forks, gear means mounted on said cross member and operatively engaging said racks for raising and lowering the forks relative to the platform for varying the spacing of said platform relative to the ground, and a rotary cutter mounted on and positioned beneath said platform.

References Cited in the file of this patent

UNITED STATES PATENTS

| Number | Name | Date |
| --- | --- | --- |
| 1,119,886 | Severson | Dec. 8, 1914 |
| 2,263,368 | Sejkora | Nov. 18, 1941 |
| 2,359,358 | Dielschneider | Oct. 3, 1944 |
| 2,490,870 | Heyn | Dec. 13, 1949 |
| 2,494,741 | Boyd | Jan. 7, 1950 |
| 2,505,377 | Barker et al. | Apr. 25, 1950 |
| 2,515,573 | Soenksen | July 18, 1950 |
| 2,552,951 | Freeman | May 15, 1951 |
| 2,568,822 | Pervis | Sept. 25, 1951 |